United States Patent [19]

Tomalia et al.

[11] 4,016,192

[45] Apr. 5, 1977

[54] UNSATURATED ACRYLIC ACID-OXAZOLINE REACTION PRODUCTS

[75] Inventors: Donald A. Tomalia; Bruce P. Thill; Thomas W. Regulski, all of Midland, Mich.

[73] Assignee: The Dow Chemical Company, Midland, Mich.

[22] Filed: Dec. 30, 1974

[21] Appl. No.: 537,215

[52] U.S. Cl. .................. 260/471 A; 260/482 R
[51] Int. Cl.$^2$ .................................. C07C 101/00
[58] Field of Search .................. 260/471 A, 482 R

[56] References Cited

UNITED STATES PATENTS

| | | | |
|---|---|---|---|
| 2,572,560 | 10/1951 | Ham | 260/482 R |
| 2,862,003 | 11/1958 | Kirchensteiner | 260/482 R |
| 3,876,518 | 4/1975 | Borden et al. | 260/482 R |

*Primary Examiner*—Paul J. Killos
*Attorney, Agent, or Firm*—L. Wayne White

[57] ABSTRACT

Ethylenically-unsaturated products are obtained by (a) reacting acrylic acid and 2-oxazoline or a 2-alkyl or aryl-2-oxazoline in an inert liquid reaction medium and (b) recovering the desired product from (a) by heating the reaction mixture under reduced pressure to strip away the liquid diluent and volatile components, thus leaving the desired product as a non-volatile residue. The reaction products can be cross-linked by conventional techniques (e.g. freeradical initiation) to form useful coatings and adhesives. For example, the product produced by heating equal molar amounts of acrylic acid and 2-ethyl-2-oxazoline in benzene gave an ethylenically-unsaturated oligomeric product having a number average molecular weight of 253 and a weight average molecular weight of 460 in approximately 95 percent yield.

10 Claims, No Drawings

UNSATURATED ACRYLIC ACID-OXAZOLINE REACTION PRODUCTS

BACKGROUND OF THE INVENTION

The present process comprises reacting acrylic acid with certain oxazoline monomers. Suprisingly few reactions are found in the literature which describe the reaction of acrylic acid with any oxazoline and those that are described produce products which are totally different from those described hereafter.

E. M. Fry, Journal of Organic Chemistry, 15, 802 (1950) and T. Kagiya et al, Polymer Letters, 4, 257 (1966) have shown that oxazoline rings are opened by carboxylic acids, thus producing the corresponding esters of the acid. Several cross-linking reactions have been described in the art wherein compounds (including polymers) bearing pendant carboxyl groups were reacted with compounds bearing 2 or more oxazoline groups, and vice versa, to form many useful cross-linked products.

Dowbenko reacted alkenoic acids (e.g., acrylic acid) with a 5-hydroxyalkyl-2-oxazoline and thus produced an alkenoic ester. Reaction occurred between the carboxyl group of the alkenoic acid and the hydroxyalkl group on the oxazoline reactant. The oxazoline ring remained intact in the process.

Riemhofer et al (USP 3,535,291) prepared a heat-curable vinyl-addition copolymer by reacting a 2-alkenyl-2-oxazoline with an alkenoic acid in the pressure of various amines. Again, the oxazoline ring remained intact in the process.

Another ring-preserving reaction is described by Tomalia in a commonly-owned U.S. patent application Ser. No. 489,382 filed July 17, 1974. Tomalia reacted equal molar amounts of an alkenoic acid with a bis-oxazoline. The product thus obtained was an acrylic ester having a pendant oxazoline group.

Thill, et. al. reacted a polymer bearing pendent-oxazoline groups with acrylic or methacrylic acid in a commonly-owned U.S. patent application Ser. No. 443,265 filed Feb. 19, 1974. The products thus produced are polymers bearing a plurality of pendent amide-ester groups.

All of the above reaction products described above are dissimilar to those defined hereafter.

SUMMARY OF THE INVENTION

It has now been discovered that the reaction of acrylic acid with 2-oxazoline or a 2-alkyl or aryl-2-oxazoline produces novel ethylenically unsaturated products. The products are non-volatile and can easily be isolated from the reaction mixture in which they are produced by merely warming the reaction mixture under reduced pressure to strip away the volatile components. The ethylenically-unsaturated products can be cross-linked by ultraviolet (uv) radiation, by electron beam techniques, or by the use of conventional free-radical initiators.

The novel products have appreciable solubility in water (e.g., greater than 10 percent) and a slight solubility in conventional polar organic solvents, such as ethanol, acetone, tetrahydrofuran, etc.

The novel ethylenically-unsaturated products appear to be one-to-one adducts of the acrylic acid and the oxazoline reactants. Molecular weight values would indicate that the products are oligomeric in nature and have a degree of polymerization ranging from two to about ten units each of acrylic acid and oxazoline reactant. Spectral analysis of the reaction products shows the presence of a tertiary amide and ester linkages, which suggest that units of the following formula might be present in the backbone:

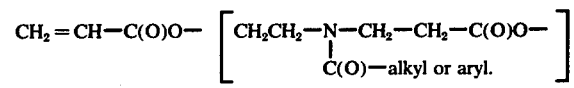

DETAILED DESCRIPTION OF THE INVENTION

The novel products are prepared as noted above, by merely heating a mixture of acrylic acid with the oxazoline reactant. Convenient rates of reaction have been observed at temperatures of from about 50° to 130° C. and preferred reaction rates have been observed at reaction temperatures of from about 70° to about 100° C. Since the reaction products appear to be essentially one to one adducts of the reactants, we normally prefer to charge essentially equal molor amounts of reactants to the reaction mixture but slight excesses of either reactant can be used if desired.

The reaction may be conducted neat or in a presence of an inert liquid diluent. The use of an inert liquid diluent facilitates temperature control and is therefore preferred. By the use of the term "inert" in describing the liquid reaction medium, we mean that the liquid diluent is inert in the process. Suitable such inert liquid diluents include aromatic hydrocarbons (e.g., benzene, toluene, and the like), chlorinated hydrocarbons (e.g., methylene chloride, methyl chloroform, chlorobenzene, and the like), acetonitrile, dimethylformamide and other like solvents.

The reaction pressure does not appear to be critical and we normally prefer to use atmospheric or autogenous pressure.

The reactants in the process are acrylic acid, which is well known, and 2-oxazoline or a 2-alkyl or 2-aryl-2-oxazoline. These oxazolines constitute a well known class of compounds, which are illustrated by 2-oxazoline, 2-methyl-, 2-ethyl-, 2-butyl-, 2-octyl-, 2-phenyl-2-oxazoline and other like compounds. Normally, the 2-substitutent will have from one to about ten carbon atoms. Preferred oxazoline reactants are the 2-methyl-, 2-ethyl-, and 2-phenyl-2-oxazolines.

The tendency of acrylic acid to thermally polymerize is a known phenomenon and the use of inhibitors for free radical polymerizations is therefore normally preferred.

The following examples will further illustrate the invention.

EXAMPLE 1 - REACTION OF ACRYLIC ACID WITH 2-ETHYL-2-OXAZOLINE

2-Ethyl-2-oxazoline (396 g, 4.0 moles) was added over a two hour period to a stirred solution of acrylic acid (288 g, 4.0 moles) in benzene (342 g) containing 0.5 g of methoxyhydroquinone inhibitor. During the addition, the temperature of the reaction mixture rose from 25° to 40° C. After the addition was complete, the mixture was heated to reflux (approximately 80° C) and maintained for twelve hours. The reaction was monitored by vapor phase chromatography to assess completion of the reaction. At the end of twelve hours, the reaction appeared to be approximately 95 percent complete. The benzene solvent, residual acrylic acid and other volatiles were removed by passing the reaction mixture through a ¾ inch by 12 inch falling film still operating at 200° C at a pressure of from 0.1 to 0.3 Torr. The oligomeric, ethylenically-unsaturated product was thus obtained as the non-volatile fraction passing through the still. Yield of the oligomer was 78.4 percent of theory. Molecular weight determination by gel permeation chromatography in dimethylformamide using universal viscosity calibration indicated a number average molecular weight of 253 and a weight average molecular weight of 460. Vinyl unsaturation by bromine-bromate titration indicated 1.30 milliequivalents of unsaturation per gram of resin. The oligomeric product has a solubility of greater than 10 percent in water, approximately 2 percent in acetic acid and a slight solubility in each of tetrahydrofuran, ethanol and acetone.

EXAMPLES 2-3

Similar oligomeric products were prepared under identical conditions, except that 2-methyl- and 2-phenyl-2-oxazoline were used as the reactants instead of the 2-ethyl-2-oxazoline. A 61.7 percent yield of the oligomer was obtained when the 2-methyl-2-oxazoline was used and a 44.8 percent yield was obtained with the 2-phenyl-2-oxazoline.

Coating Applications

Hydroxypropylacerylate (15 g), pentaerythritol triacrylate (1.6 g) - a cross-linker, and VICURE 10 (1.6 g), a benzoin ether type uv sensitizer from Stauffer Chemical Company, were blended with 14.1 g of the oligomer described in Example 1. The mixture was coated onto bonderized steel panels using a No. 46 Meyer Rod. The coated surface was then irradiated with a G.E. sunlamp at a distance of 20 centimeters for 30 minutes under a nitrogen blanket. The coating cured to a tack-free surface having the following properties:

Percent Adhesion — 100
Gardner Reverse Impact — 30 inch pounds
Water Resistance — 30 double rubs
Pencil Hardness — approximately 2H The adhesion was measured by crosshatching the coated surface in approximately 1/16 inch square, applying to the crosshatched section approximately 3 inches of Scotch-Brand tape, and rapidly pulling the tape from the surface at approximately a 90° angle. Essentially none of the coating was removed under this test.

Adhesion Applications

Another aliquot of the ethylenically-unsaturated product from Example 1 (65 parts by weight) was blended with hydroxypropylacrylate (35 parts by weight) and the mixture coated on a corona-treated polyester film, overlayed with a second layer of a corona-treated polyester film and the laminate irradiated with a 2 MEV. electrons in a nitrogen atmosphere to a 1 MRAD total dosage. The force necessary to separate the Mylar strips was found to be 500–600 g/cm. of width (determined using an Instron Tester). The failure was by film failure of the polyester rather than adhesion failure at the interface. The above two coating experiments indicate that the material can be used to form a hard protective coating and that the novel ethylencailly-unsaturated materials can also be used as an adhesive.

Other oxazolines within the above definition can be similarly reacted with acrylic acid to give valuable and useful ethylenically-unsaturated products.

What is claimed is:
1. An ethylenically-unsaturated reaction product produced by (a) reacting by contacting acrylic acid and 2-oxazoline or a 2-alkyl or a 2-aryl-2-oxazoline in an inert liquid reaction medium at a temperature sufficient to cause reaction between said acrylic acid and oxazoline, and (b) recovering the ethylenically-unsaturated reaction product.
2. The product produced according to claim 1 wherein said oxazoline is 2-methyl-, 2-ethyl, or 2-phenyl-2-oxazoline.
3. The product produced according to claim 2 wherein said oxazoline is 2-methyl-2-oxazoline.
4. The process produced according to claim 2 wherein said oxazoline is 2-ethyl-2-oxazoline.
5. The product produced according to claim 2 wherein said oxazoline is 2-phenyl-2-oxazoline.
6. The product produced according to claim 1 wherein said acrylic acid and oxazoline are initially present in substantially equal molar amounts in the reaction mixture.
7. The product produced according to claim 1 wherein (a) is conducted at a reaction temperature of from about 50° to about 130° C.
8. The product produced according to claim 7 wherein the reaction temperature is from about 70° to about 100° C.
9. The product produced according to claim 1 wherein the 2-alkyl or 2-aryl substituent of said oxazoline has from 1 to about 10 carbon atoms.
10. The product produced according to claim 2 wherein (a) is conducted at a reaction temperature of from about 50° to about 130° C.

* * * * *